United States Patent [19]

Focke

[11] Patent Number: 5,143,509

[45] Date of Patent: Sep. 1, 1992

[54] PROCESS AND APPARATUS FOR REMOVING ARTICLES FROM AN UNDERLAYER WITH HIGH FRICTIONAL RESISTANCE

[75] Inventor: Heinz Focke, Verden, Fed. Rep. of Germany

[73] Assignee: Focke & Co., Verden, Fed. Rep. of Germany

[21] Appl. No.: 515,990

[22] Filed: Apr. 27, 1990

[30] Foreign Application Priority Data

May 3, 1989 [DE] Fed. Rep. of Germany ..... 39145980

[51] Int. Cl.$^5$ .................... B65G 59/00; B65G 47/90
[52] U.S. Cl. .................. 414/796; 414/786; 414/676; 414/903
[58] Field of Search ............. 414/795.5, 795.8, 795.9, 414/796.2, 796.8, 903, 676, 786, 796

[56] References Cited

U.S. PATENT DOCUMENTS

| | | | |
|---|---|---|---|
| 2,517,388 | 8/1950 | Daves | 414/903 X |
| 2,886,190 | 5/1959 | Beaulieu et al. | 414/796 X |
| 3,253,665 | 5/1966 | Schienle | 414/676 X |
| 3,261,177 | 7/1966 | Amann et al. | 417/676 X |
| 3,272,359 | 9/1966 | Thomas et al. | 414/676 |
| 3,398,841 | 8/1968 | Mohr | 414/796 X |
| 4,032,021 | 6/1977 | Mabey et al. | 414/796.8 X |
| 4,119,219 | 10/1978 | Marschke | 414/796 |
| 4,231,697 | 11/1980 | Franz | 414/796.8 X |
| 4,500,244 | 2/1985 | Sardella et al. | 414/796 X |
| 4,613,267 | 9/1986 | Mohr et al. | 414/796 X |

FOREIGN PATENT DOCUMENTS

| | | |
|---|---|---|
| 1280735 | 10/1968 | Fed. Rep. of Germany ... 414/796.8 |
| 2506319 | 2/1983 | Fed. Rep. of Germany . |
| 2626528 | 12/1983 | Fed. Rep. of Germany . |
| 3613462 | 10/1987 | Fed. Rep. of Germany . |
| 3444776 | 7/1988 | Fed. Rep. of Germany . |
| 1393037 | 2/1965 | France . |
| 462106 | 10/1968 | Switzerland ......... 414/903 |
| 1180461 | 2/1970 | United Kingdom . |

Primary Examiner—Robert J. Spar
Assistant Examiner—Brian K. Dinicola
Attorney, Agent, or Firm—Sughrue, Mion, Zinn, Macpeak & Seas

[57] ABSTRACT

This invention relates to a process and an apparatus for removing articles from an underlayer with high frictional resistance, especially for removing several layers of cartons with one underlayer each from a pallet. By generating an air cushion at the upper side of the underlayer (19) underneath the articles (cartons 20), the articles (cartons 20), gliding on the air cushion, can then be removed from the underlayer (19) with transverse movement by means of an unloading apparatus (10). It is possible to remove even delicate and flexible packs from an underlayer with high frictional resistance by transverse movement.

20 Claims, 7 Drawing Sheets

PROCESS AND APPARATUS FOR REMOVING ARTICLES FROM AN UNDERLAYER WITH HIGH FRICTIONAL RESISTANCE

BACKGROUND OF THE INVENTION

The invention relates to a process and an apparatus for removing articles from an underlayer with high frictional resistance, especially for removing layers of cartons with one underlayer each from a pallet.

When cartons are produced or filled, they are generally deposited on pallets in several layers, such that they are put on intermediate layers made of corrugated board and having an antislip-coating. The surfaces of these intermediate layers have an extremely high frictional resistance, so that the cartons can not shift relative to one another during transport and further handling of the pallets. After the pallets are loaded, they have to be unloaded again somewhere else. The cartons removed from the pallets are either put on a conveyor belt or on a sorting table for forming groups of these cartons. The cartons are usually grasped and moved and thus unloaded from the pallets by means of vacuum grippers which engage an upper carton wall with suction means.

The customary use of vacuum grippers, however, has proved to be impossible, if delicate and instable packs (cartons) which are open at the top are to be handled. The suction a means do not find sufficient hold for grasping these type of packs.

SUMMARY OF THE INVENTION

The invention is based on the object to provide a process and an apparatus which make it possible to remove delicate unstable packs (cartons) which are open at the top from an underlayer with high frictional resistance.

The object with respect to the process is attained by generating an air cushion at the upper side of the underlayer underneath the articles (cartons) and then removing the articles (cartons), gliding on the air cushion, from the underlayer with transverse movement by means of an unloading apparatus. The cartons are lifted by the air cushion, so that they are easily shiftable in transverse direction inspite of the high frictional resistance of the upper face of the underlayer.

The air cushion is advantageously generated by compressed air emerging at the upper side of the underlayer from air outlets. The compressed air is preferably supplied to the underlayer provided with cavities via two connection ports for compressed-air jets. The articles (cartons), gliding on the air cushion, are removed from the underlayer for example by means of a pusher of the unloading apparatus, with which complete layers are removed at a time. Moreover the compressed-air jets are advantageously arranged on gripping arms of the unloading apparatus, the underlayer being grasped and removed by the gripping arms by means of compressed-air jets preferably locking into two lateral connection ports.

The object of the invention is attained by providing the underlayer with preferably two connection ports for compressed-air jets and by providing the underlayer with cavities which lead from the connection ports for the compressed-air jets to the air outlets at the upper face, it is possible to generate an air cushion underneath the articles in a simple way. This air cushion ensures that the articles (cartons) can be removed from the underlayer such that they glide on the air cushion and are moved transversely by means of an unloading apparatus. The connection ports for the compressed-air jets are expediently arranged on opposite side faces of the unloading apparatus. The underlayer can thus be safely grasped at the connection ports. The unloading apparatus is usually provided with a pusher for removing the articles (cartons) lying on the underlayer.

Preferably, two compressed-air jets are advantageously arranged on two gripping arms of the unloading apparatus. These gripping arms are formed by two pivotable arms which are articulated on the unloading apparatus and on connecting pieces bearing the compressed-air jets, such that the connecting pieces with the compressed-air jets are pivotable without changing their orientation, thus preventing the compressed-air jets from canting relative to the connection ports of the underlayers being always deposited in a horizontal position. Moreover, it is possible to transport the underlayers during the unloading process in horizontal orientation onto a horizontal depositing surface.

Since the compressed-air Jets are arranged in the connecting pieces in an axially shiftable way by means of a positioning device, it is possible to introduce the compressed-air jets after they have been positioned into the connection ports without any difficulties. Moreover, the conical connection faces act as sealing faces. Because the compressed-air jets positively lock into the connection ports of the underlayers, a safe connection during the unloading process is also ensured. It is of further advantage, if the depositing surface is disposed in an invariable plane on a lowerable depositing pallet. The underlayers are thus deposited with the gripping arms always having the same angular position and they are deposited such that an exactly oriented stack is formed on the depositing pallet.

BRIEF DESCRIPTION OF THE DRAWINGS

A preferred embodiment of the invention is described in more detail below with reference to the drawings which show.

DESCRIPTION OF A PREFERRED EMBODIMENT

Figure 1:
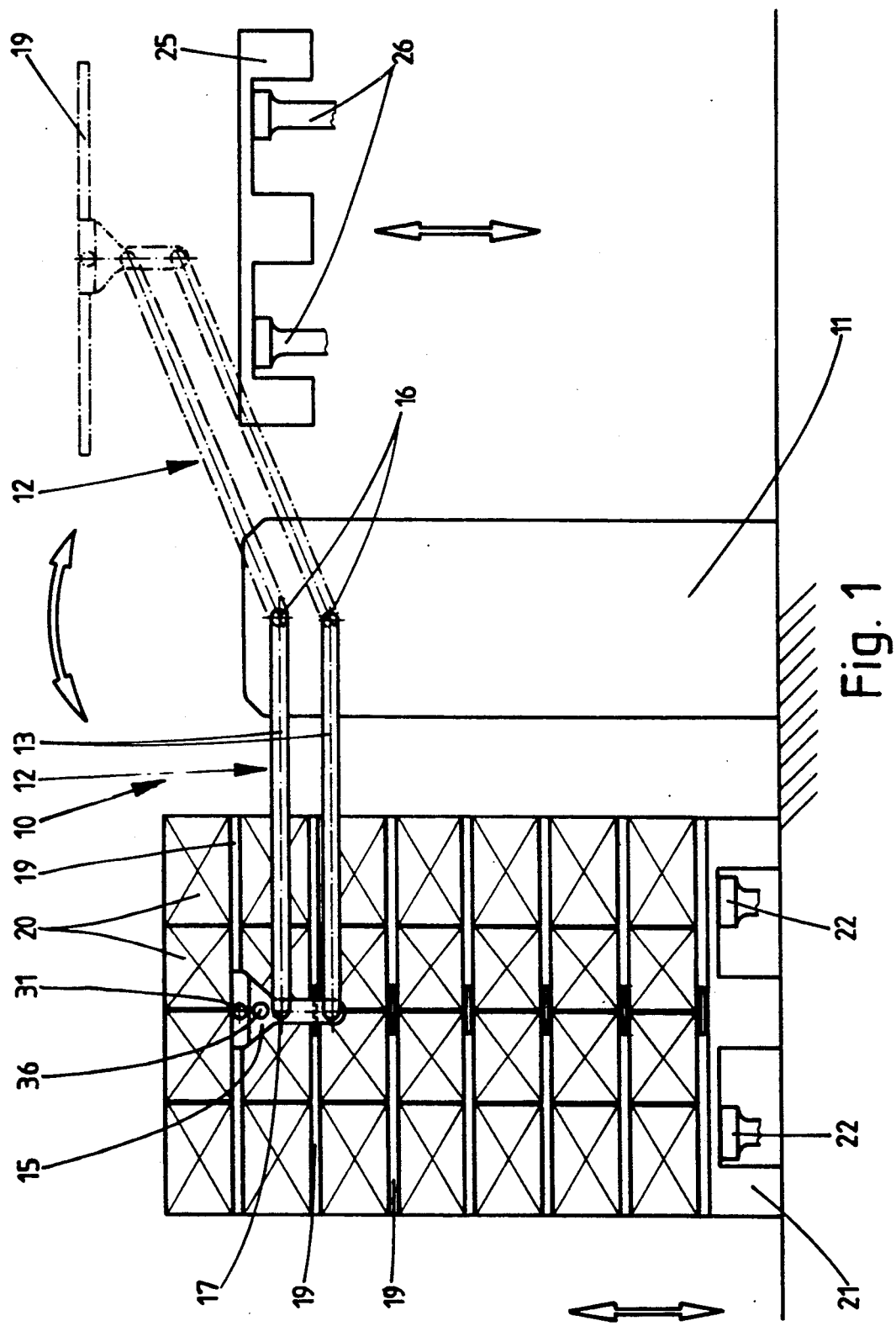
FIG. 1 a side view of the apparatus.

The exemplary embodiment of the invention which will be described in the following relates to an unloading apparatus 10. As shown particularly by FIGS. 1 and 2, two gripping arms 12 are pivotably arranged on a support 11 of the unloading apparatus 10. These gripping arms 12 are formed by two parallel pivotable arms 13 each, which are articulated on the unloading apparatus 10, i.e. on the support 11 and on connecting pieces 15 bearing compressed-air jets or nozzles 14 (FIG. 3–7).

The arms 13 are articulated by means of joints 16 being arranged on the support 11 and joints 17 being arranged on the connecting pieces 15.

The compressed-air jets 14 of the connecting pieces 15 can lock into connection ports 18 (FIG. 4 and 5) of one underlayer 19 for cartons 20 at a time. The cartons 20 are stacked on a pallet 21 in several layers above one another, each layer resting on an underlayer 19. Arranged underneath the pallet 21 are props 22 of a lifting device for the pallet 21. This device is not shown in the drawing. During unloading, the pallet 21 can be moved upwards in synchronized steps by means of the props 22. The cartons 20 can thus be removed from an invariable unloading plane.

Figure 2:
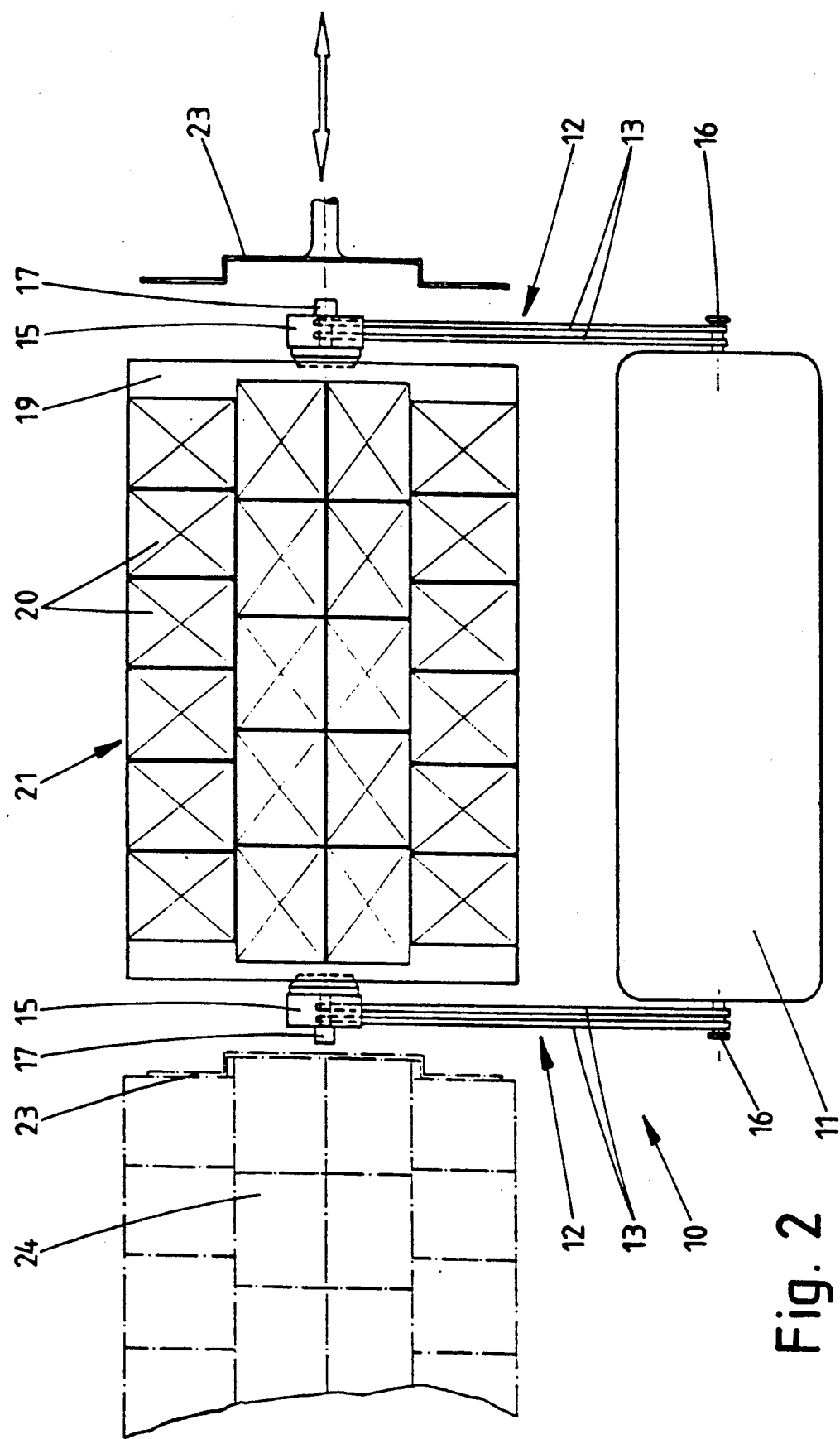
FIG. 2 a top plan view of the apparatus according to FIG. 1.

The unloading apparatus 10 is also provided with a pusher 23 shown in FIG. 2. By means of this pusher 23, the cartons 20 can be pushed off in pairs from the pallet 21 onto a sorting table 24 arranged next to the pallet 21. There is also arranged a depositing pallet 25 (FIG. 1), on which the removed underlayers 19 can be deposited. Arranged underneath the depositing pallet 25 are props 26 of a lifting device not shown in the drawing. During the process of stacking the underlayers 19, the depositing pallet 25 can be lowered by means of these props 26.

Figure 3:
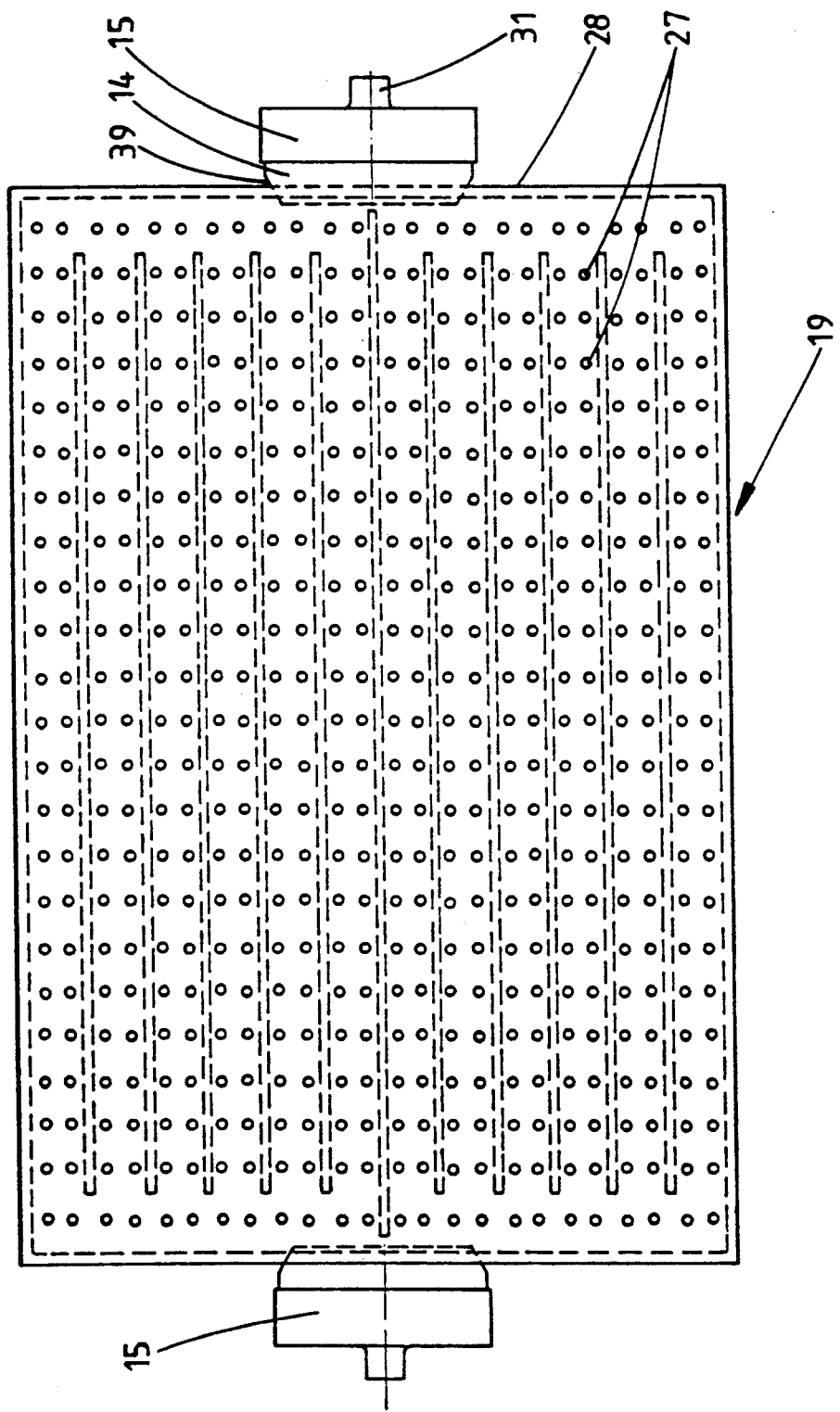
FIG. 3 a top plan view of an underlayer.
Figure 4:
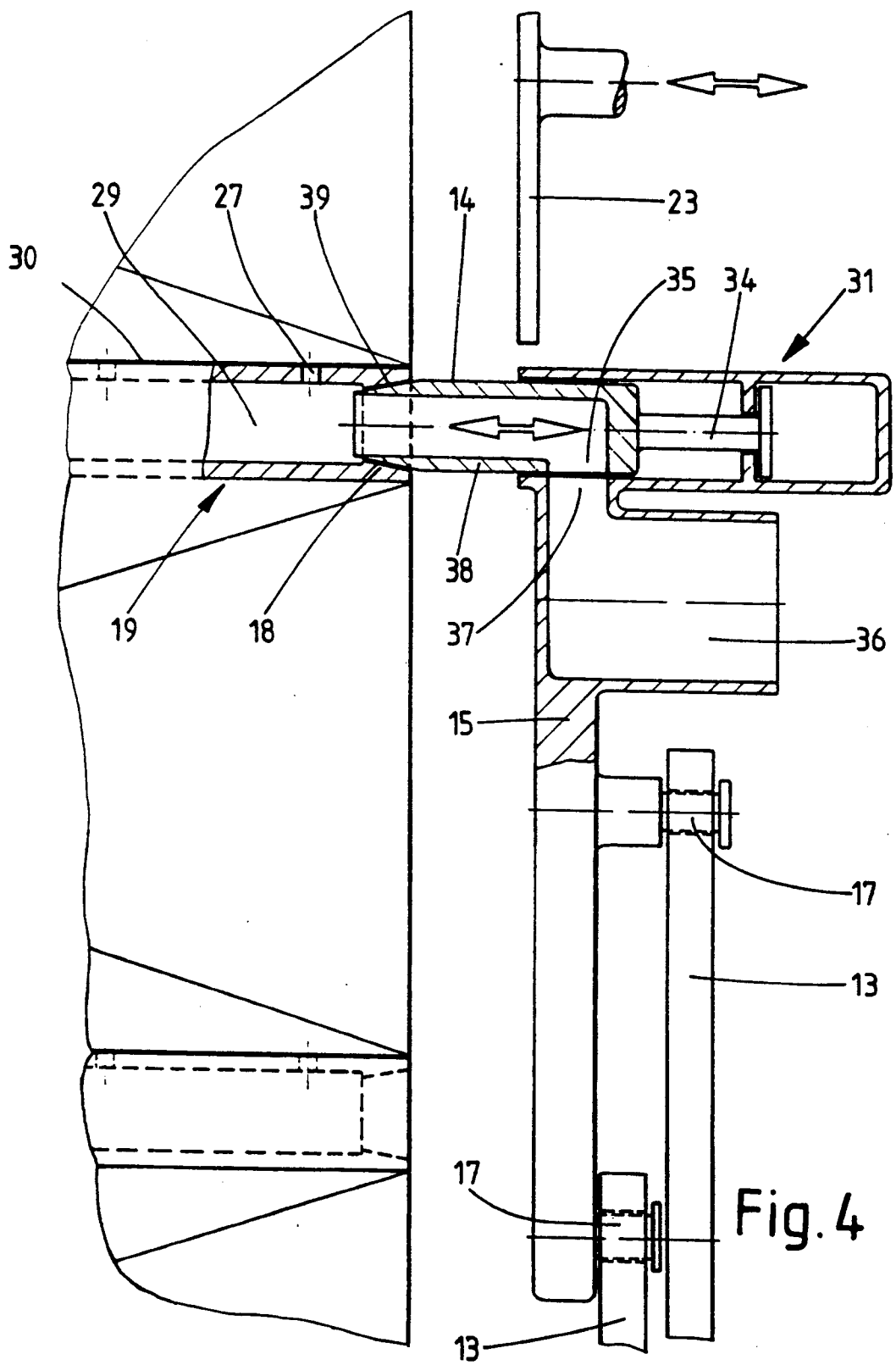
FIG. 4 a cross-section of a connecting piece with a compressed-air jet locking into a connection port of the underlayer, FIG. 5 a cross-section of the connecting piece according to FIG. 4 in ready position before introduction into the connection port, FIG. 6 a top plan view of the connecting piece with the compressed-air jet according to FIG. 5, FIG. 7 the connecting piece according to FIG. 5 viewed from the underlayer.
Figure 5:
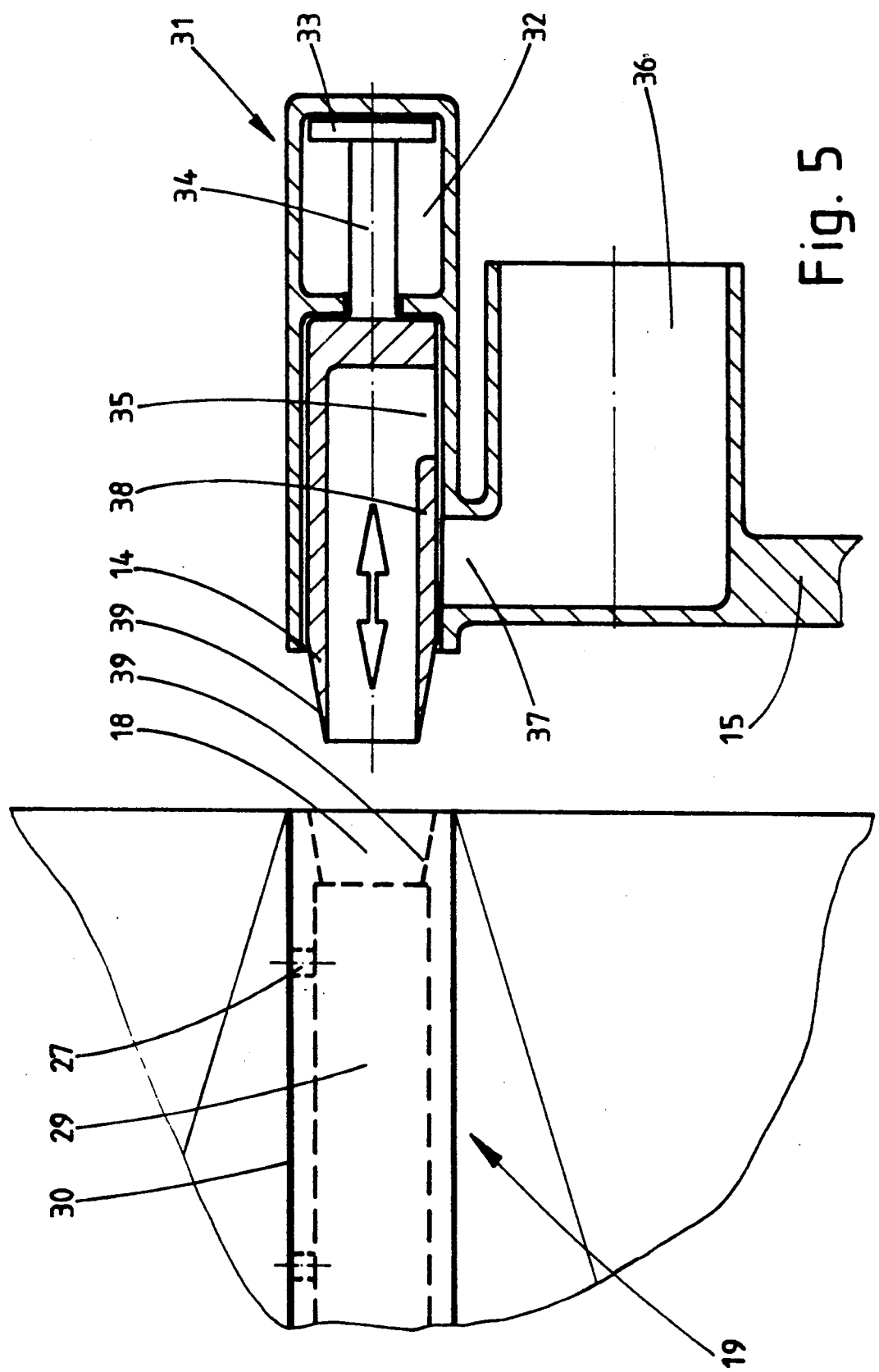
Figure 6:
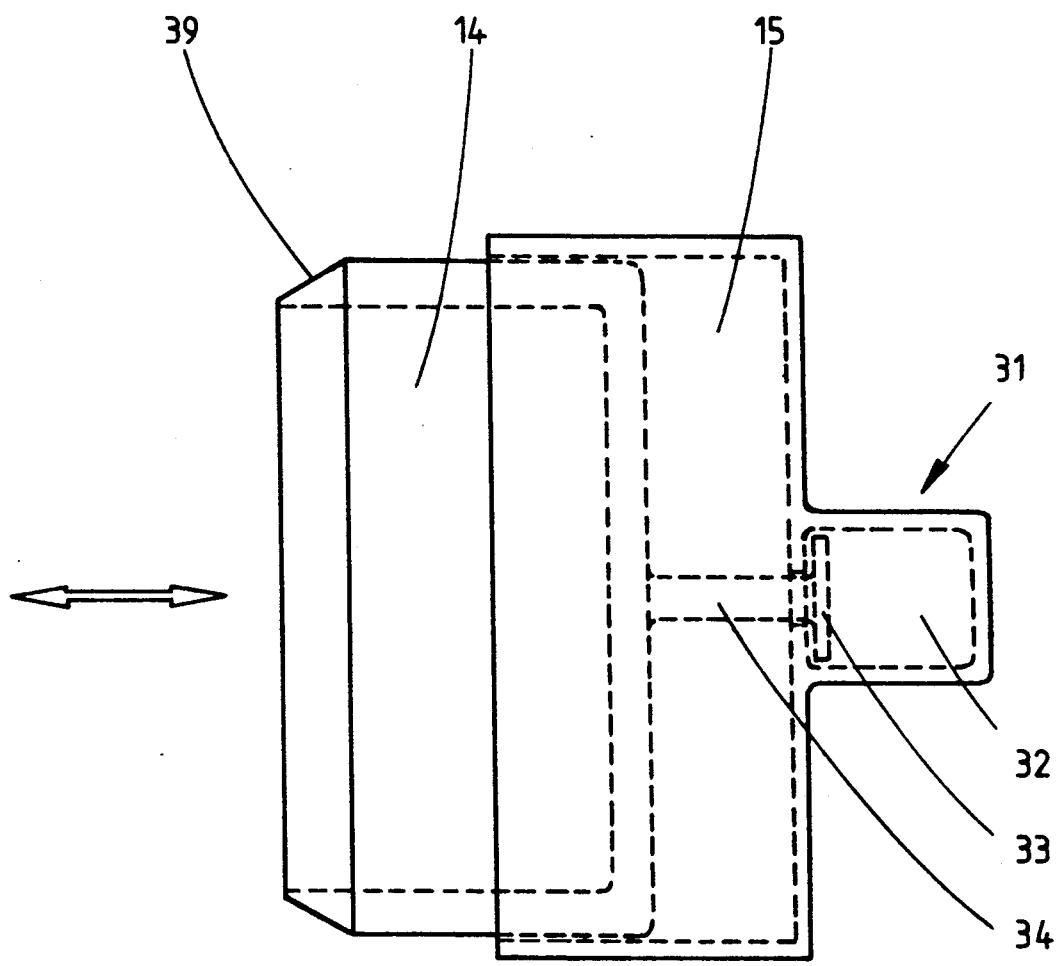

As shown in FIGS. 3, 4 and 5, each underlayer 19 is provided with air outlets 27 on its upper side. The connection ports 18 for the compressed-air jets 14 are arranged on opposite side faces 28 of the underlayer 19. Cavities 29 disposed in the underlayer link the connection ports 18 with the air outlets 27. The upper side and possibly also the bottom side of the underlayers 19 are provided with an antislip-coating 30. One antislip-coating 30 on the upper side would actually be sufficient for holding the individual cartons 20. Providing the bottom side of the underlayer 19 with another antislip-coating 30 is an improvement insofar as it additionally gives the underlayer 19 a better grip on the layer of cartons 20 underneath.

As is particularly shown by FIGS. 4 and 5 of the drawings, the compressed-air jets 14 are arranged in the connecting pieces 15 so they are shiftable in an axial direction. For this purpose, a positioning device 31 is provided, which is formed by a piston 33 arranged in a cylinder 32 with a piston rod 34. By means of alternate admission of compressed air to the two end faces of the piston 33, the compressed-air jet 14 can be moved in both directions.

On its bottom side, each compressed-air jet 14 has an inlet 35 for compressed air. Each connecting piece 15 has a compressed-air connection 36 as well as an outlet 37 for compressed air matching the inlet 35 of the compressed-air jet 14. In ready position of the compressed-air jet 14 shown in FIG. 5, its inlet 35 is closed by a wall 38, but as soon as the compressed-air jet 14 is pushed into one of the connection ports 18 of the underlayer 19 by means of the positioning device 31, compressed air can get from the outlet 37 of the connecting piece 15 via the inlet 35 into the compressed-air jet 14 and then enter into the cavity 29 of the underlayer 19, with the result that an air-cushion is generated underneath the cartons 20 stacked on the underlayer 19.

Figure 7:
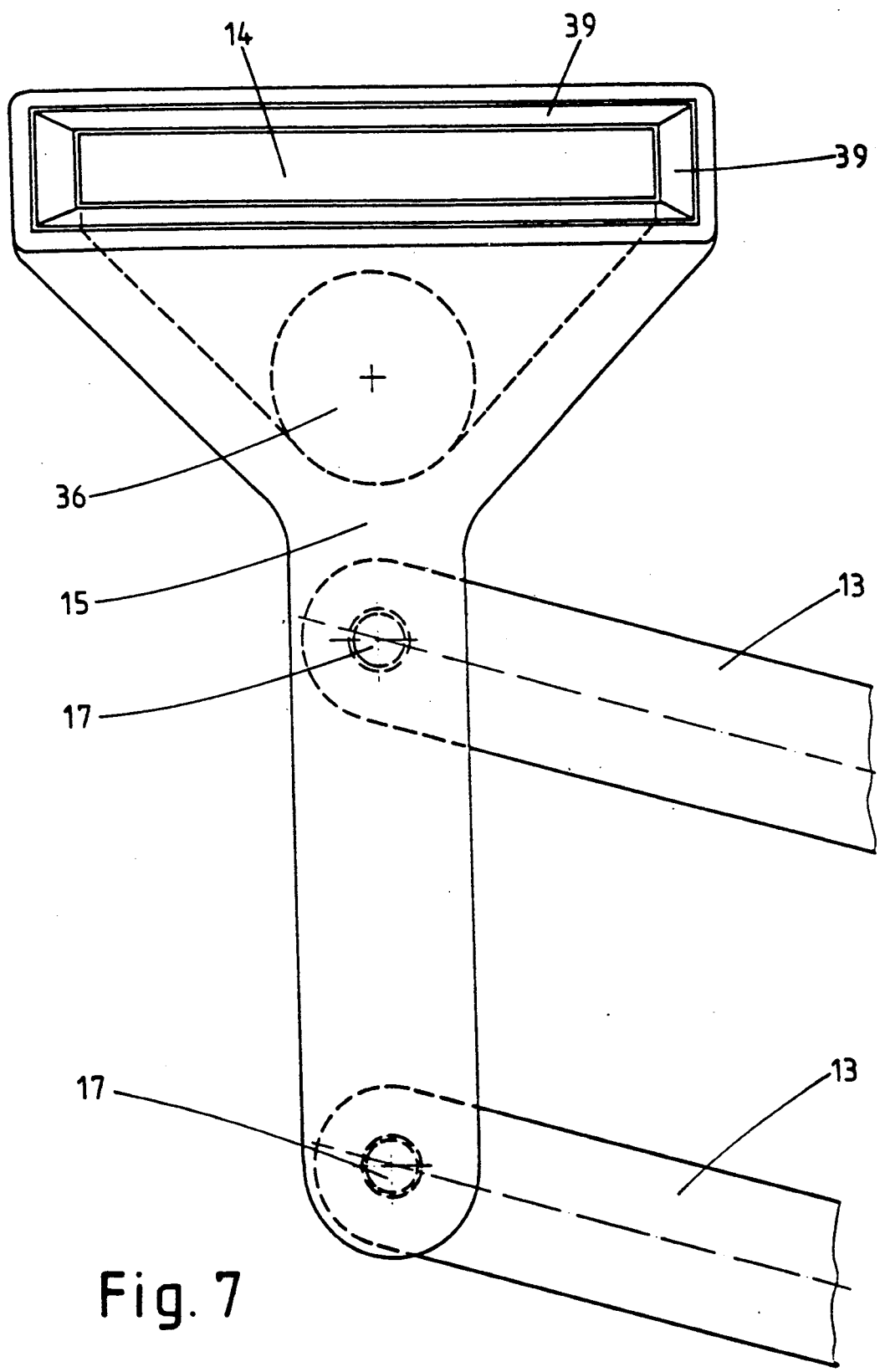

Conical connection faces 39 in the connection ports 18 and at the compressed-air jets 14 guarantee that the compressed-air jets 14 can be introduced into the connection ports 18 without any difficulties. Moreover, the conical connection faces 39 act as sealing faces preventing a loss of compressed air. FIG. 7 illustrates that the connection ports 18 and the compressed-air jets 14 are of rectangular shape, which ensures that the underlayers 19 are removed in their s horizontal position by gripping arms 12 without tilting. A tilting of the underlayers 19 could cause problems when depositing them on the depositing pallet 25.

The unloading apparatus 10 basically operates like this: The pallets 21 with the cartons 20 which are arranged in a non-slip manner on the underlayers 19 with the antislip-coating 30 are successively placed in position in the unloading plane by the unloading apparatus 10, ready to be unloaded. Then, the gripping arms 12 move the connecting pieces 15 with the compressed-air jets 14 in front of connection ports 18 of the positioned under/layer 19. By actuating the positioning device 31, the compressed-air jets 14 are introduced into the connection ports 18. Herewith, the inlet 35 for compressed air of the compressed-air jets opens, as already described. The compressed air enters the underlayer 19 and reaches the air outlets 27 on the upper side via cavities 29. Thus, an air cushion is formed at the bottom side of the cartons 20 deposited on the underlayer 19. This air cushion lifts the cartons 20, so that the antislip-coating 30 of the underlayer 19 is rendered ineffective.

The pusher 23 of the unloading apparatus 10 can now push the cartons 20, gliding on the air cushion, onto the sorting table 24. Subsequently, the gripping arms 12 of the unloading apparatus 10 pivot in direction of the depositing pallet 25, and the compressed-air jets, being locked into the connection ports 18, take along the underlayer 19. Since the gripping arms 12 are formed by two parallel arms 13, the connecting pieces 15 with the compressed-air jets 14 keep their orientation during the pivoting process. Because the compressed-air jets 14 and the connection ports 18 are of rectangular shape and positively interlock, the underlayers 19 are inevitably also led in horizontal position. Hence, the underlayers 19 are deposited on the depositing pallet 25 in this horizontal position, so that the formation of an oriented stack on the depositing pallet 25 is ensured. This applies even more so, since the depositing s pallet 25 is lowered all the time by means of the props 26, thus guaranteeing an invariable depositing plane. Consequently, the underlayers are always deposited exactly on top of one another.

By lifting the pallet 21 by means of the prop 22 after each unloading process, an invariable unloading plane is also guaranteed. The pusher therefore always move on the level of the sorting table 24. It is furthermore of importance, that the respective underlayer 19 always lies in an invariable plane too. Consequently, the connection ports 18 are also always lying in an invariable plane. This means that the gripping arms 12 can perform constant pivoting motions. At the final point of the pivoting motion of the gripping arms 12, the compressed-air jets arranged in the connecting pieces 15 are always exactly in front of the connection ports 18. No other orienting processes are needed for introducing the compressed-air jets 14, only the positioning device has to be actuated.

By means of the air cushion underneath the cartons arranged on the underlayer 19 it has been achieved in a surprisingly simple way that even delicate and instable packs can be removed from an underlayer with extremely high frictional resistance by way of transverse shifting without any difficulties. The expenditure needed therefore is not higher than with known apparatuses.

What is claimed is:

1. An unloading apparatus for carrying out a process for removing articles from a horizontally oriented underlayer having a high frictional resistance, there being plural underlayers stacked on a pallet, and each underlayer having a layer of articles placed on a horizontal upper side of the underlayer, said process comprising the steps of:

a) supplying compressed air, from two opposite lateral sides of one of said underlayers (19), to a cavity (29) in said one underlayer (19);
   b) generating with the compressed air an air cushion at the upper side of said one underlayer (19) and underneath the articles placed thereon; and
   c) removing the articles from said one underlayer (19) by means of only a horizontal movement of an unloading apparatus (10), said articles horizontally gliding on said air cushion during said only horizontal movement, wherein said generating step comprises forming the air cushion by forcing the compressed air through vertically directed air outlets (27) in the upper side of said one underlayer (19);

said unloading apparatus comprising two compressed-air nozzles, wherein each of said underlayer (19) is provided with two connection ports (18), each connection part receiving one of said compressed-air nozzles (14) and a respective connection port (18) being located on a corresponding one of said opposite lateral sides of said underlayer (19), wherein the cavity (29) in said underlayer (19) is in communication with said communication ports (18) and with said air outlets (27) in the upper side of said underlayer (19);

wherein said unloading apparatus (10) comprises a horizontally movable pusher (23) for removing said articles from said underlayer (19) by horizontal movement of said articles;

wherein said two compressed-air nozzles (14) lockingly engage said two connection ports (18) and are arranged on two gripping arm means (12), respectively, of said unloading apparatus (10) for removing said underlayer (19) from the pallet, said underlayer (19), after the articles are removed therefrom, being removable in a horizontal orientation from the pallet and deposited onto a deposited onto a depositing surface (25) by said gripping arm means (12); and wherein each of said gripping arm means (12) comprises two parallel pivotable arms (13) which are pivotally secured to said unloading apparatus (10), and a respective connecting piece pivotally secured to said pivotable arms, a respective connecting piece (15) carrying one of said compressed-air nozzles (14), such that said connecting pieces (15) with said compressed-air nozzles (14) are movable in a vertical plane without changing their orientation relative to said arms.

2. The apparatus according to claim 1, wherein said compressed-air nozzles (14) are arranged in said connecting pieces (15) in an axially and horizontally shiftable manner by means of a positioning device (31), and wherein said compressed-air nozzles (14) are insertable into said connection ports (18) of said underlayer (19).

3. The apparatus according to claim 2, wherein said compressed-air nozzle (14) and said connection ports (18) are of rectangular shape and are provided with conical connection faces (39) such that said compressed-air nozzles (14) and said connection ports (18) are hermetically telescopable.

4. The apparatus according to claim 3, wherein said compressed-air nozzles (14) positively lock into said connection ports (18) of said underlayer (19).

5. The apparatus according to claim 4, wherein said depositing surface is disposed in an invariable plane on a lowerable depositing pallet (25).

6. The unloading apparatus according to claim 1, further comprising at least one of said underlayers (19) which has said two connection ports (18), said cavity (29), and said air outlets (27) in the upper side of said underlayer.

7. A process for removing articles from a horizontally oriented underlayer having a high frictional resistance, there being plural underlayers stacked on a pallet, and each underlayer having a layer of articles placed on horizontal upper side of the underlayer, said process comprising the steps of:

a) supplying compressed air, from two opposite lateral sides of one of said underlayers (19), to a cavity (29) in said one underlayer (19);
   b) generating with the compressed air an air cushion at the upper side of said one underlayer (19) and underneath the articles placed thereon;
   c) removing the articles from said one underlayer (19) by means of only a horizontal movement of an unloading apparatus (10), said articles horizontally gliding on said air cushion during said only horizontal movement;
   d) providing the unloading apparatus with a pusher (23), wherein said removing step comprises removing the articles, gliding on the air cushion, from said one underlayer by means of horizontal motion of said pusher (23);
   e) providing vertically and upwardly directed air outlets (27) in the upper side of said one underlayer (19), wherein said generating step comprises forming the air cushion by forcing the compressed air through said vertically and upwardly directed air outlets (27) in the upper side of said one underlayer (19);
   f) providing the unloading apparatus with two compressed-air nozzles (14) and providing the underlayer (19) with two lateral connection ports (18), wherein said supplying step comprises supplying the compressed air from the two compressed-air nozzles (14) to said cavity (29) of said underlayer (19) via the two lateral connection ports (18) located on said two opposite lateral sides, respectively, of the underlayer (19); and
   g) providing the unloading apparatus with two gripping arms (12), arranging said compressed-air nozzles (14) on said gripping arms (12) of said unloading apparatus (10), and, after removal of the articles from the underlayer (19), grasping and removing the underlayer (19) from the pallet by said gripping arms (12) by causing the two compressed-air nozzles (14) to lock into the two lateral connection ports (18), respectively.

8. The process according to claim 7, wherein said articles are cartons (20).

9. An apparatus for removing articles from a horizontally-oriented underlayer having a high frictional resistance, there being a plurality of underlayers stacked on a pallet, and each underlayer having a layer of articles placed on a horizontal upper side of the underlayer, wherein each of said underlayers (19) comprises: a pair of opposite lateral sides; an internal cavity (29); a plurality of vertically-directed air outlets (27) in said horizontally oriented upper side of the underlayer, said air outlets (27) being in air-communication with said cavity; and two connection ports (18), a respective connection port being located on a corresponding one of said opposite lateral sides of the underlayer and being in air-communication with said cavity;

said apparatus comprising:

compressed-air nozzle means (14) for supplying to said connection ports (18) compressed air which flows through said cavity (29) and through said air outlets (27) to form at said upper side of said underlayer (19) an air cushion being said upper side and bottoms of the articles placed on the underlayer; and unloading means (10) for removing from each underlayer (19), at a fixed vertical height, the articles by horizontal movement thereof, said articles horizontally gliding on said air cushion during said horizontal movement;

wherein said unloading means (10) comprises two gripping arm means (12) and wherein said nozzle means (14) comprises two nozzles, each nozzle being carried by a respective one of said two gripping arm means and being insertable into a corresponding one of said two connection ports (18);

wherein each of said connection ports (18) is in the form of a conical recess, and wherein said of said nozzles has a conical shape which is complementary to the shape of the conical recess, so that each nozzle (14) interlocks with a corresponding connection port (18) and wherein; said apparatus further comprises;

a depositing surface for receiving each underlayer (19) after the articles have been removed therefrom, and means for moving said two gripping arm means (12) to said depositing surface while said nozzles (14) are interlocked with said corresponding connection ports (18).

10. The apparatus according to claim 9, further comprising at least one of said underlayers (19) which has said internal cavity (29), said plurality of vertically-directed air outlets (27) and said two connection ports (18).

11. A process for horizontally removing articles vertically arranged in several layers on a pallet, comprising the steps of:

positioning underneath each layer (19) having a high frictional resistance which prevents slippage of the layer on the underlayer;

providing each underlayer (19) on opposite sides thereof with two lateral connection ports (18) for connection to a supply of compressed air;

providing an upper surface of each underlayer with upwardly directed air outlets (27) which are in air-communication with the connection ports (18);

generating an air cushion on the upper surface of the underlayer (19) by causing the compressed air to escape through the air outlets (27);

removing, with an unloading apparatus (10), the articles from the underlayer (10) by causing them to glide in a horizontal direction on the air cushion; and providing the unloading apparatus with gripping arms (12) carrying compressed-air nozzles (14) for supplying the compressed air to the connection portion (18); and, after removal of the articles, locking the compressed-air nozzles (14) into the connection ports (18) to grasp and remove the underlayer from the pallet.

12. The process for removing articles according to claim 11, further comprising the step of, after the articles have been removed from the underlayer, horizontally moving the underlayer to a fixed depositing plane and depositing the underlayer thereon.

13. An unloading apparatus from horizontally removing articles vertically arranged in several layers on a pallet, there being positioned underneath each layer an underlayer (19), wherein each underlayer includes an upper surface and two opposite lateral sides, said upper surface having an high frictional resistance which prevents slippage of a layer thereon and said opposite lateral sides each having a respective connection port (18) for connection to a supply of compressed air, and wherein said upper surface of each underlayer has upwardly directed air outlets (27) which are in air communication with the connection ports (18), said apparatus comprising:

means for generating an air cushion on said upper surface of the underlayer (19) by forcing compressed air through said connection ports (18) and said air outlets (27), said means for generating including two compressed-air nozzles (14) for supplying the compressed air to the connection ports (18);

pushing means (23), carried by said unloading apparatus (10), for removing the articles from the underlayer (19) by causing the articles to glide in a horizontal direction on the air cushion;

a plurality of gripping arms, each gripping arm carrying one of said compressed-air nozzles; and means for locking said compressed-air nozzles (14) into said connection ports (18) and, after removal of the articles by said pushing means (23), for grasping and removing the underlayer from the pallet.

14. The unloading apparatus according to claim 13, wherein:

a) each gripping arm (12) includes two elongated links (13) which are pivotable in parallel;

b) said gripping arms (12) are articulated on the unloading apparatus (10), and each gripping arm (12) has a connecting piece (15) which is connected to one of said compressed-air nozzles (14); and c) when said gripping arms (12) are pivoted, said connecting pieces (15) and said compressed-air nozzles (14) always have the same orientation.

15. The apparatus according to claim 14, wherein:

a) said connecting pieces (15) comprise positioning devices (31) for an axial displacement of the compressed-air nozzles (14); and b) said compressed-air nozzles (14) are insertable into the connection ports (18) of each underlayer by means of said positioning devices (31).

16. The apparatus according to claim 13, wherein said compressed-air nozzles (14), on the one hand, and the connection ports (18) in the underlayers (19), on the other hand, have conical connection faces (39) which interlock in a sealing manner.

17. The apparatus according to claim 13, wherein:

a) said compressed-air nozzles (14) positively lock into the connection ports (18) of the underlayers (19); and b) said gripping arms (12) are adapted to move the underlayers (19) from the pallet onto a depositing surface in a horizontal position.

18. The apparatus according to claim 17, wherein said depositing surface is disposed in a horizontal plane on a lowerable depositing pallet (25).

19. The apparatus according to claim 13, wherein said pusher means comprises a pusher (23) for removing the articles from the underlayer (19) by a transverse horizontal movement of the pusher.

20. The unloading apparatus according to claim 13, further comprising said underlayer (19) which has said two lateral connection ports (18) and said upwardly directed air outlets (27).

* * * * *